July 25, 1933.  H. O. SIEGMUND  1,919,808
POWER SUPPLY SYSTEM
Filed Jan. 1, 1930  2 Sheets-Sheet 1
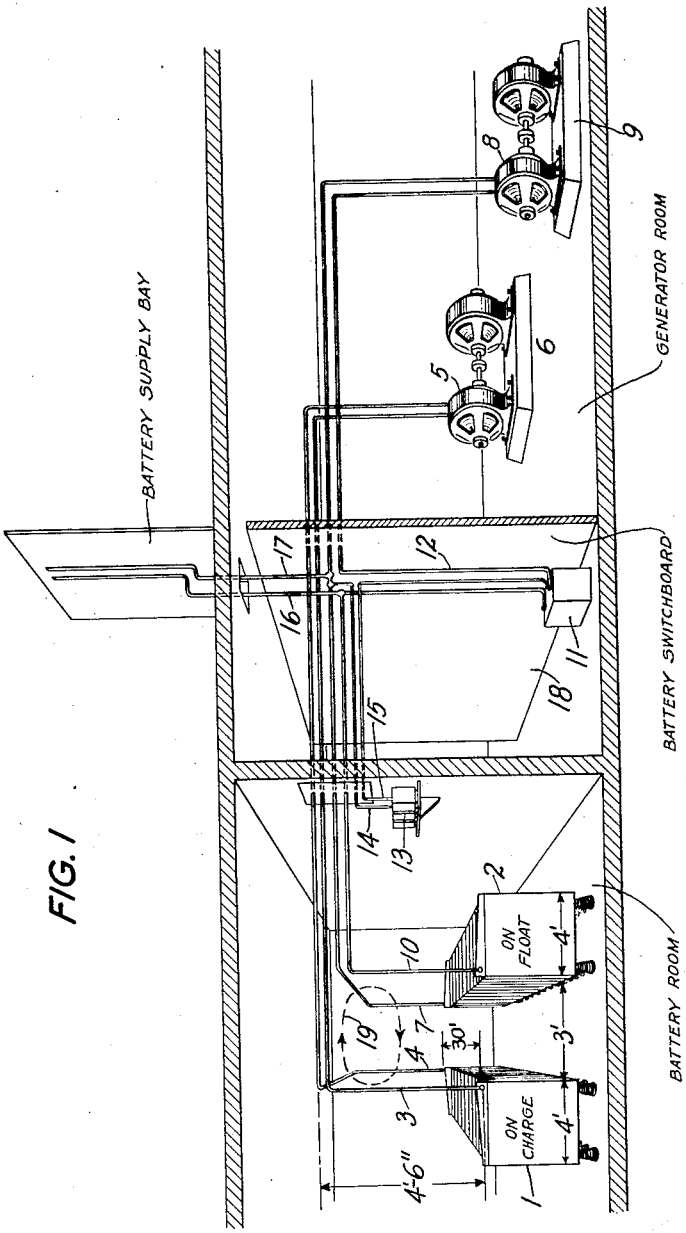
INVENTOR
*H. O. SIEGMUND*
BY
ATTORNEY July 25, 1933.   H. O. SIEGMUND   1,919,808
POWER SUPPLY SYSTEM
Filed Jan. 1, 1930   2 Sheets-Sheet 2
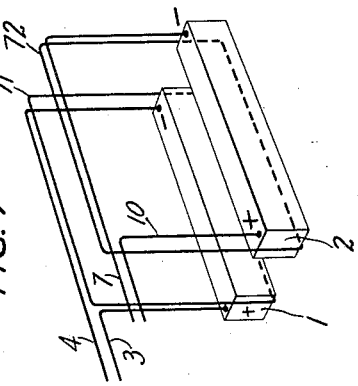
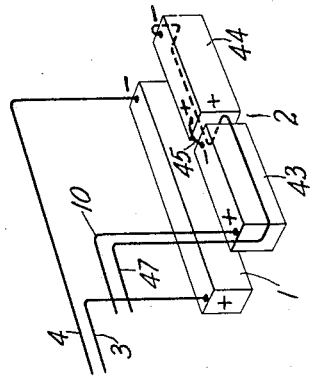
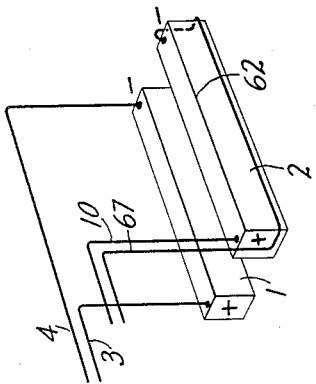
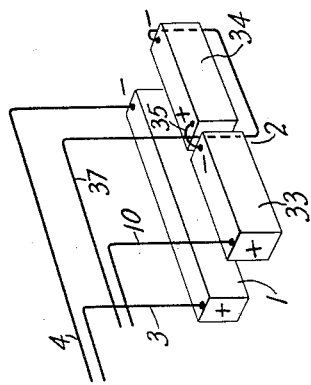
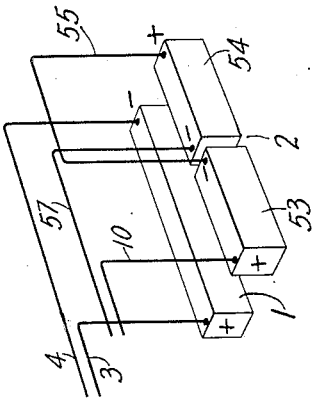
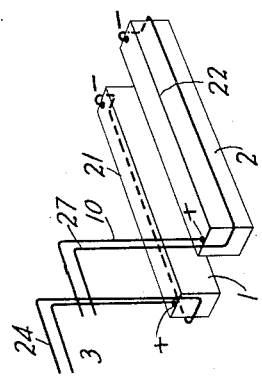
INVENTOR
*H. O. SIEGMUND*
BY
*N. A. Burgess*
ATTORNEY Patented July 25, 1933

1,919,808

UNITED STATES PATENT OFFICE

HUMPHREYS O. SIEGMUND, OF WEST ORANGE, NEW JERSEY, ASSIGNOR TO BELL TELEPHONE LABORATORIES, INCORPORATED, OF NEW YORK, N. Y., A CORPORATION OF NEW YORK

POWER SUPPLY SYSTEM

Application filed January 1, 1930. Serial No. 417,843.

The present invention relates to improvements in electric signaling systems and more particularly in power supply circuits for such systems.

It is characteristic of commercial generators that commutation gives rise to ripples or alternating currents of audible frequencies which if superimposed upon the talking circuits would result in poor quality and noisy transmission. One way of avoiding commutation effects in the past, has been by the use of specially designed generators. However, such generators are expensive and with the advent of dial systems and the accompanying increase in power requirements, economy has dictated the abolition of costly generators and the introduction of commercial type generators.

It is customary in central offices to install all power equipment, including batteries, together. This equipment includes a charging generator directly connected to an idle battery and a second generator floating a second battery through suitable filter arrangements between the battery and the generator. It has been found that when one generator is charging one of the batteries while a second generator is floating another battery located parallel to the first battery, considerable interference is encountered due to the inductive pick-up from the charging battery and its associated charge and discharge leads.

An object of this invention is to provide means for eliminating noise in a signal transmission system caused by induction from associated and neighboring power leads.

Another object of the invention is to provide means for eliminating this interference from the charging battery without necessitating the use of separate shielded rooms for the battery and its associated charging generator and for the second battery and its associated floating generator and without necessitating extensive changes in the power equipment such as would be necessary if a filter arrangement were employed in the line between the charging battery and charging generator associated therewith or if filter arrangements were employed between the floating battery and the transmission line.

One of the features of the invention is the use of short-circuited loops paralleling the separate batteries and battery leads so as to materially reduce the inductive effects of one circuit including its associated battery upon the other circuits.

Another feature of the invention is the use of battery leads transposed in such a manner as to materially reduce the interaction between the two circuits including the batteries which are parallel to each other without the use of short-circuited loops.

The invention will be better understood by referring to the following description in connection with the associated drawings in which Fig. 1 shows a typical duplicate power supply system comprising duplicate batteries together with their associated charging and floating equipment, Figs. 2 to 6 each show a different method of transposing the leads to and from the duplicate batteries to reduce interference between the two power supply systems, and Fig. 7 shows the use of short-circuited leads paralleling the separate batteries and battery leads.

Referring to Fig. 1, the batteries 1 and 2 are located in the battery room parallel to each other. The battery 1 is connected by means of conductors 3 and 4 to the charging generator 5 of the motor generator set 6. One terminal of the battery 2 is directly connected by means of the conductor 7 to the floating generator 8 of the motor generator 9. The other terminal of the battery 2 is connected by means of the conductor 10 through the choke or retardation coil 11 and conductor 12 to the generator 8. The condensers 13 are connected by means of conductors 14 and 15 and the conductors 7 and 12 in shunt with the floating generator 8. The power supply leads 16 and 17 which run to the battery supply bay are connected to the terminals of the battery 2 by means of the conductors 7 and 10. The switches usually mounted on the battery switchboard 18 which are employed to change the battery 1 from "charge" to "float" and the battery 2 from "float" to "charge" have been omitted from the drawings as their use forms no part of this invention. The condensers 13 have been shown mounted in their usual position in the battery room and the retardation or induction coil 11 shown in its usual position in the battery switchboard room.

The batteries 1 and 2 are usually of the same size as they are alternately used to supply the same load. The usual dimensions of the battery cells employed are 4 ft. square and these cells are placed side by side to form a battery of cells approximately 30 ft. long. It is apparent that batteries of this size are best located, as far as floor space is concerned, parallel to each other. The conductors 3 and 4 from the battery 1 and the conductors 7 and 10 from the battery 2 are usually run from their respective battery terminals directly upward toward the ceiling of the battery room for a height of approximately 4½ ft. from the top of the batteries. The conductors 4 and 7 are run from their respective points directly above the battery terminals parallel to and directly over the respective batteries associated therewith to a point adjacent to the conductors 3 and 10 respectively. The conductors associated with each battery run from the point directly over the front terminal of the battery associated therewith to the battery switchboard 18.

In installations such as described above, the battery 1 and its associated conductors 3 and 4 form a loop and the battery 2 and its associated conductors 7 and 10 form a second loop. There exists between these two loops mutual inductance, as shown at 19 on the drawings, which causes the noise components existing in the unfiltered current flowing from the charging generator 5 through conductors 3 and 4 to the battery 1 to be induced in the loop comprising the battery 2 and its associated conductors 7 and 10. These noise components are transmitted from the conductors 7 and 10 to the supply conductors 16 and 17 which are connected thereto.

As the planes of these two loops are located parallel to each other and have their centers on a line perpendicular to the planes of the loops substantially maximum coupling exists between them.

Fig. 2 shows an arrangement in which the conductors 3 and 10 from the front terminals of the batteries 1 and 2 are arranged as in Fig. 1 and the conductors 24 and 27 from the rear terminals are transposed to reduce the flux linkage between the loops formed by these batteries and their associated conductors. In this arrangement the lead 24 from the rear or negative terminal of the battery 1 is run along the side 21 of the battery 1 which is not adjacent to the battery 2 to a point adjacent to the positive terminal of the battery 1 and the lead 27 from the negative terminal of the battery 2 is run along the side 22 of the battery 2 which is not adjacent the battery 1 to a point adjacent to the positive terminal of the battery 2. In this manner the loop formed by the battery 1 and the conductor 24 is in the same plane as the loop formed by the battery 2 and conductor 27 and the center lines of the two loops are parallel to each other. The two loops are however separated from each other by an appreciable distance. This results in loose coupling between the two loops and reduces the noise components induced in the conductors 10 and 27 of the battery 2 which is on float.

Fig. 3 shows an arrangement in which the battery 1 and its associated conductors 3 and 4 are located the same as in Fig. 1. The battery 2 has been divided in two halves 33 and 34. The conductor 10 which is connected to the positive terminal of the front half 33 of the battery 2, which terminal is also the front or positive terminal of the battery 2, is arranged as in Fig. 1. The positive terminal of the rear half 34 of the battery 2 is adjacent to the negative terminal of the front half 33 and is connected thereto by means of a short conductor 35. The negative terminal of the rear half 34, which is also the rear or negative terminal of the battery 2, is adjacent to the negative terminal of the battery 1. Conductor 37 is connected to the negative terminal of the battery 2 and is run underneath the rear half 34 of the battery 2 and parallel thereto, up between the two halves 33 and 34 and then parallel to the front half 33 of the battery 2.

The loop formed by the conductor 10, front half 33 of battery 2, conductor 35, rear half of battery 2 and conductor 37 will be in the form of a figure 8. It will be parallel to the loop formed by battery 1 and conductors 3 and 4. The distance from the center line of the rear half 34 of the battery 2 to the conductor 34 is preferably such that the flux interlinkages in each half of the figure 8 loop formed by the battery 2 and the conductors 10 and 37 are equal. The noise components induced in the portion of the loop comprising conductor 10, front half 33 of battery 2 and the portion of conductor 37 which is above battery 2 will be in opposite direction to and will balance out the noise components induced in that portion of the loop formed by the rear half 34 of battery 2 and that portion of conductor 37 which is below the rear half 34 of the battery 2.

Fig. 4 shows an arrangement similar to that of Fig. 3 in which the conductor 47 from the rear or negative terminal of the battery 2 is run along the side of the rear half 44 of the battery 2 adjacent to the battery 1, between the halves 43 and 44 and along the side of the front half 43 which is not adjacent to the battery 1.

The conductors 10 and 47 and the two halves of the battery 2 form a loop the shape of a figure 8 having its plane perpendicular to the plane of the loop formed by the battery 1 and conductors 3 and 4. In this arrangement the noise components induced in the figure 8 loop comprising the battery 2 and the conductors 10, 45 and 47 are reduced by the reason of the fact that it is perpendicular to the plane of the loop formed by the battery 1 and its associated conductors 3 and 4 and the noise components induced in each half of the figure 8 loop are in opposite directions and tend to oppose or neutralize each other as in the arrangement shown in Fig. 3. As in the case of Fig. 3, the figure 8 loop is preferably arranged such that the flux interlinkages in each half are equal.

Fig. 5 shows an arrangement in which the battery 1 and its associated conductors are located the same as in Fig. 1. The battery 2 is divided into two halves 53 and 54. The conductor 10 which is connected to the positive terminal of the front half 53, which terminal is also the front or positive terminal of the battery 2, is arranged as in Fig. 1. The rear half 54 is arranged to have its negative terminal adjacent to the negative terminal of the front half 53. A conductor 55 connects the negative terminal of the front half 53 to the positive terminal of the rear half 54. The conductor 55 is preferably run directly upward from the front half 53, then parallel and directly over the rear half 54 and downward to the positive terminal of the rear half 54. The conductor 57 is preferably run directly upward from the negative terminal of the rear half 54, which is also the negative terminal of the battery 2, to the same height as conductors 10 and 55 and then directly over and parallel to the front half 53.

The battery 2 and its associated conductors will form a figure 8 loop having two equal halves in which halves the noise components induced from the battery 1 and conductors 3 and 4 are in opposite directions and tend to neutralize each other as in the arrangement shown in Fig. 3.

Fig. 6 shows an arrangement in which the battery 1 and the associated conductors 3 and 4 are located the same as in Fig. 1. The conductor 10 which is connected to the positive terminal of the battery 2 is arranged in the same manner as in Fig. 1. Conductor 67 which is connected to the negative terminal of battery 2 is run from the negative terminal along the side 62 of battery 2, which side is not adjacent to the battery 1 to a point adjacent to a positive terminal of the battery 2.

This arrangement provides a loop formed by the battery 2 and its associated conductors 10 and 67 whose plane is tangential to the flux paths of the magnetic field set up by the loop comprising the battery 1 and its associated conductors 3 and 4. This materially reduces the noise components introduced in the loop formed by the battery 2 and its associated conductors.

In Fig. 7 the batteries 1 and 2 and their associated conductors 3 and 4 and 7 and 10 respectively, are arranged as in Fig. 1. The loop formed by the battery 1 and its associated conductors 3 and 4 is parallelled by a short-circuited loop 71. The short-circuited loop 71 is preferably located close to the conductors 3 and 4 and the battery 1. The loop may be formed in a variety of ways. If the conductors 3 and 4 are lead-covered single conductor cables, the lead sheaths can be connected together at the point where the conductors 3 and 4 come together and lead tape or jointed copper bus bar run along the battery bank and connected to the conductors 3 and 4 at points adjacent to the battery terminals. If the conductors 3 and 4 do not have a metallic sheath, lead tape or jointed copper bus bar can be run parallel to the conductors as well as along the battery banks. Preferably the battery 2 and its associated conductors 7 and 10 are parallelled by a second short-circuited loop 72. This loop is preferably identical with the short-circuited loop 71.

The short-circuited loops being adjacent to the loops formed by the batteries 1 and 2 and their associated conductors absorb the energy of the noise components ordinarily induced in one battery loop by the other and materially reduce the noise components induced in the loop comprising the battery "on float" and its associated conductors.

Although in each of the arrangements shown in Figs. 3, 4, 5 and 6, the conductors to the battery 2 are transposed and the conductors to the battery 1 are the same as for the arrangement of Fig. 1, it is within the spirit of this invention to make the transposition of the battery conductors to the battery 1 instead of the battery 2. It is also understood that two or more of the arrangements described could be employed in a single installation, as for example transposing the leads of the battery 1 in any one of the arrangements shown in Figs. 3, 4, 5 and 6 in accordance with the arrangement shown in Fig. 2, or by adding short-circuited loops to the battery 1 in accordance with the teaching of the arrangement shown in Fig. 7, the arrangements shown in Figs. 3, 4, 5 or 6.

While several embodiments of the invention have been shown and described above in detail it is understood that the invention is generic in character and is not to be considered to be limited to the particular embodiments described since numerous modifications thereof may be made by persons skilled in the art without departure from the spirit of applicant's invention, the scope of which is to be determined by the appended claims.

What is claimed is:

1. In combination, storage batteries for use as a source of direct current, a generator for charging one of said storage batteries and conductors for connecting said one battery to its generator while the other battery is connected to a load circuit, said conductors, including said batteries, being arranged that there will be no inductive effects evidenced in those conductors through which energy is being supplied to the load circuit from those conductors which are supplying energy from said generator to said one battery.

2. In combination, storage batteries, a generator for charging one of said storage batteries and conductors for associating said one battery with its generator and for associating the other battery with a load circuit, said conductors, including said batteries, having an anti-inductive arrangement so that varying currents in one set of conductors will cause no varying currents in the other set of said conductors.

3. In a telephone exchange or repeater station, a battery room in which a plurality of batteries are housed side by side, current generating means for charging one of said batteries while another of said batteries is connected to supply current to a telephone circuit, and means comprising non-inductively related loops including said batteries and their charge-discharge circuits for preventing generator noise in the charging conductors of said one battery from setting up noise currents in the telephone circuit to which said other battery is connected.

HUMPHREYS O. SIEGMUND.